(12) United States Patent
Lehmann

(10) Patent No.: US 6,708,665 B1
(45) Date of Patent: Mar. 23, 2004

(54) FLUID COOLING DEVICE

(75) Inventor: Frank Lehmann, St. Ingbert (DE)

(73) Assignee: Hydac Fluidtechnik GmbH, Sulzbach/Saar (DE)

( * ) Notice: Subject to any disclaimer, the term of this patent is extended or adjusted under 35 U.S.C. 154(b) by 0 days.

(21) Appl. No.: 10/070,364

(22) PCT Filed: Aug. 9, 2000

(86) PCT No.: PCT/EP00/07729

§ 371 (c)(1),
(2), (4) Date: Mar. 6, 2002

(87) PCT Pub. No.: WO01/18363

PCT Pub. Date: Mar. 15, 2001

(30) Foreign Application Priority Data

Sep. 7, 1999 (DE) .......................... 199 42 543

(51) Int. Cl.[7] .................................. F28F 3/00
(52) U.S. Cl. ............................. 123/196 AB; 123/196 R; 123/196 A
(58) Field of Search ...................... 123/196 AB, 196 A, 123/196 R

(56) References Cited

U.S. PATENT DOCUMENTS

| | | | |
|---|---|---|---|
| 3,741,342 A | | 6/1973 | Maddalozzo |
| 4,370,957 A | * | 2/1983 | Skatsche et al. ....... 123/196 AB |
| 4,426,965 A | * | 1/1984 | Patel .................... 123/196 AB |
| 4,752,387 A | * | 6/1988 | Thomas .................. 123/196 A |
| 5,199,395 A | * | 4/1993 | Mizumura et al. ..... 123/196 AB |
| 5,207,898 A | * | 5/1993 | Hodgkins ................ 123/196 A |
| 5,351,664 A | * | 10/1994 | Rotter et al. .......... 123/196 AB |
| 5,477,817 A | * | 12/1995 | Hufendiek ............ 123/196 AB |
| 5,538,626 A | | 7/1996 | Baumann |
| 5,566,781 A | * | 10/1996 | Robert et al. ........... 123/196 A |
| 5,647,306 A | * | 7/1997 | Pateman ............... 123/196 AB |
| 5,653,206 A | * | 8/1997 | Spurgin ................ 123/196 AB |
| 5,887,561 A | * | 3/1999 | Spurgin ................ 123/196 AB |
| 5,887,562 A | | 3/1999 | von Esebeck et al. |
| 5,967,112 A | * | 10/1999 | Haga et al. ........... 123/196 AB |
| 6,263,962 B1 | * | 7/2001 | Komoda et al. ...... 123/196 AB |

FOREIGN PATENT DOCUMENTS

| | | |
|---|---|---|
| DE | 2948088 | 6/1981 |
| DE | 4237028 | 5/1994 |
| DE | 19704209 | 8/1998 |
| DE | 19731558 | 1/1999 |

* cited by examiner

Primary Examiner—Henry C. Yuen
Assistant Examiner—Jason Benton
(74) Attorney, Agent, or Firm—Roylance, Abrams, Berdo & Goodman, LLP

(57) ABSTRACT

A fluid cooling device has a cooler, filter and pump combined in a building unit. Fluid conveyed by the pump can be filtered in a fluid circuit by the filter and can be cooled in the circuit by the cooler. The filter is provided with at least one filter element that can be exchanged when the filter is clogged. A controllable unit is provided in the fluid circuit for exchanging the filter element. The filter can be separated from the pump by the controllable unit in such a way that the cooler is still supplied with the fluid to be cooled. The filter element can be exchanged without entailing further difficulties, even when the downstream supply of lubricating oil is not stopped.

17 Claims, 3 Drawing Sheets

FLUID COOLING DEVICE

FIELD OF THE INVENTION

The present invention relates to a fluid cooling device with cooling, filtering and pumping means combined in one unit. In the fluid circuit, the fluid delivered by the pumping means can be filtered by the filtering means and can be cooled by the cooling means. The filtering means has at least one filter element which can be replaced when it becomes fouled.

BACKGROUND OF THE INVENTION

In known solutions, DE-A-29 48 088, the disclosed pumping-cooling-filtering unit is a compact unit which is easy to install for filtered cooling circuits, preferably in a bypass flow. To connect the known fluid cooling device, hydraulic piping only to and from the tank and the voltage supply need be installed. The fluid cooling device, which can be connected in the bypass flow as important components, has a quietly operating delivery pump, a fluid filter and an oil-water plate heat exchanger. Applications of the known units are plastic injection molding machines, presses, machining centers, wind power plants and gearing.

The filtering means or the filter of the fluid cooling device should be changed from time to time depending on the degree of its fouling, i.e., replaced by a new means or filter unit. In known solutions, the entire fluid cooling device must be shut down. Also, the entire fluid system in which the fluid cooling device is being used must be turned off. Another possibility is to provide a change-over filter providing a filtered lubricating oil supply for changing the filter element as well. The change-over filter, however, occupies a relatively large amount of installation space and makes the known solutions overall more expensive (DE-A-42 37 028).

U.S. Pat. No. 3,741,342 discloses a generic fluid cooling device used in the lubricating circuit of motor vehicles to ensure, for the entire range of operating temperatures, that engine parts, such as the pistons, bearing rings, cams, etc., are adequately lubricated. For this purpose, lubricating oil, as the fluid from the "oilpan" of the driving motor (engine), is relayed via a pump to a cooling means. The lubricating oil cooled in this way is relayed to a valve means located in the bypass to the two filter units. At low temperatures of the lubricating oil, the bypass valve allows direct lubrication of the driving motor, bypassing the filtering means. When the temperatures rise, the filters are then enlisted to filter the lubricating oil. If the pressure in the fluid or lubricating oil circuit continues to rise, which is generally the case when the temperature of the lubricating oil rises, another valve means is engaged for bypassing the filters and for supplying the heated lubricating oil directly to the cooling means to prevent damage to the filters and to improve the cooling situation in the lubricating circuit.

If the respective filter in the known fluid device needs to be replaced by a new one, the fluid cooling device must be shut down completely for changing of the filter element.

SUMMARY OF THE INVENTION

Objects of the present invention are to improve conventional fluid cooling devices so that the filter element can be changed without additional cost, even if the downstream lubricating oil supply is not shut down.

In the foregoing objects are basically obtained by a fluid cooling device combining cooling, filtering and pumping in one unit, comprising a fluid circuit, a pump in the fluid circuit for conveying fluid through the fluid circuit, a filter, with a replaceable filter element upon becoming fouled, in the fluid circuit, and a cooler for cooling fluid in the fluid circuit. A control valve in the fluid circuit separates the filter from the pump, while fluid continues to be supplied to the cooler for cooling, for replacement of the filter element. The control valve is actuatable by hand and has a catch retaining the control valve in a set position. A bypass connecting line in the fluid circuit extends parallel to the filter and connects to a supply line leading to the cooler for supplying fluid to the cooler when the filter is separated form the pump.

The foregoing objects are also obtained by a fluid cooling device combining cooling, filtering and pumping in one unit, comprising a fluid circuit, a pump in the fluid circuit for conveying fluid through the fluid circuit, a filter, with a replaceable filter element upon becoming fouled, in the fluid circuit, and a cooler for cooling fluid in the fluid circuit. A control valve in the fluid circuit separates the filter from the pump, while fluid continues to be supplied to the cooler for cooling, for replacement of the filter element. A bypass connecting line in the fluid circuit extends parallel to the filter and connects to a supply line leading to the cooler for supplying fluid to the cooler when said filter is separated from the pump. At least one check valve in the bypass connecting line opens in the direction of the cooler.

For replacement of the filter element in the fluid circuit, the control valve with which the filter unit can be separated from the fluid supply is provided. The cooling means continues to be supplied with the fluid to be cooled. The fluid flow or oil flow is routed past the filter which is to be changed via a bypass. Heated oil is cooled by the cooling means for further use in a machine doing mechanical work or the like.

The solution of the present invention can be economically implemented and allows safe changing of the filter element without the operator being exposed to safety hazards. Since the filter element is generally changed quickly, the contamination transferred via the bypass arrangement to fluid cooling can be tolerated and does not adversely affect subsequent fluid supply for a machine doing mechanical work.

In one preferred embodiment of the fluid cooling device of the present invention, for fluid supply of the cooling means within the fluid circuit in the bypass branch, a connecting line discharges or opens on the end side into the supply line for the filter and the cooling means. In this way, a fluid cooling device of especially compact structure is achieved. Preferably, the control valve can be actuated by hand and provided with a catch means which preserves the set position. This arrangement ensures operating reliability of the device.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
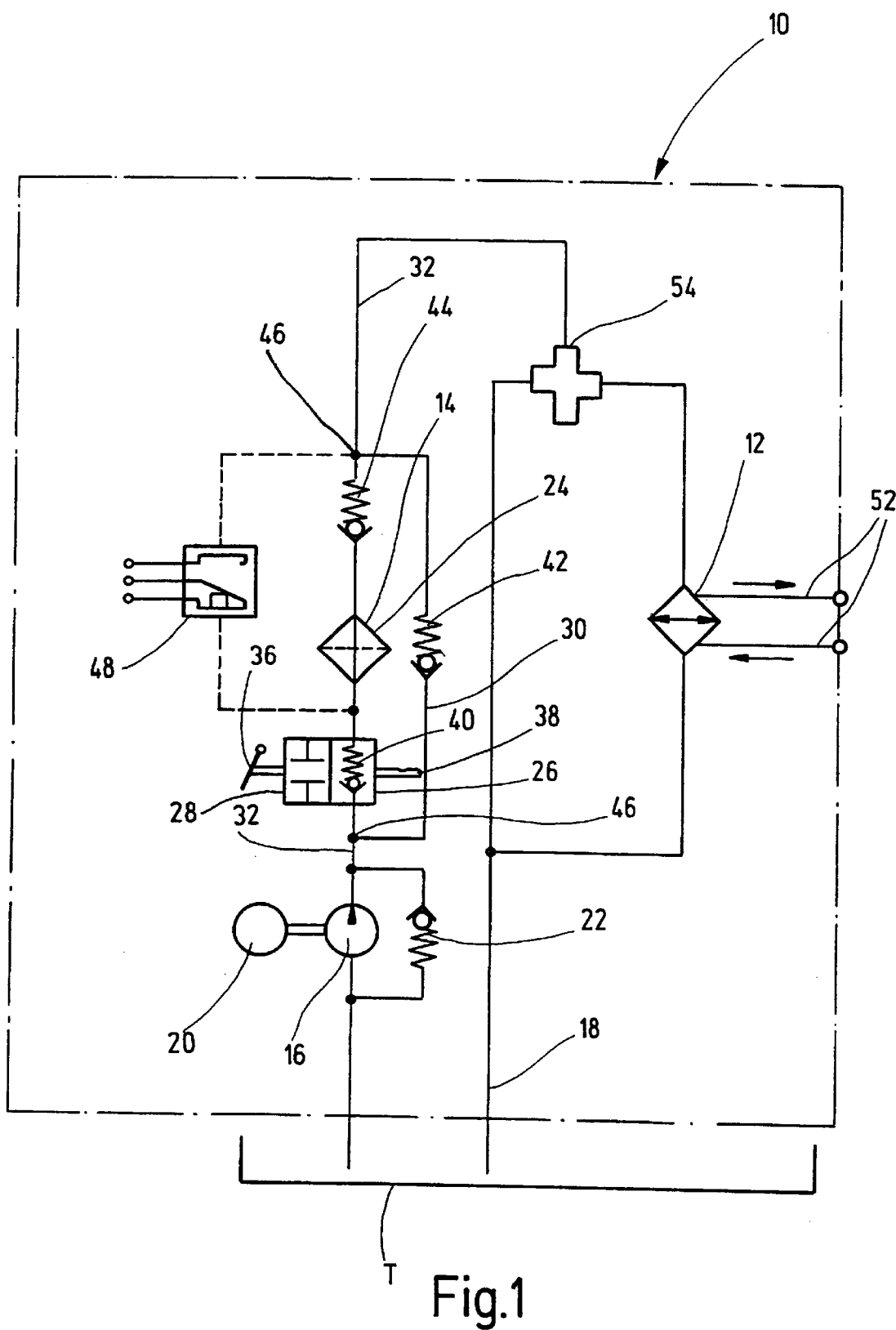
FIG. 1 is a schematic circuit diagram of a cooling device according to the present invention.

The fluid cooling device has, combined in one unit 10, at least one cooling means 12, one filtering means 14 and one pump means 16. The fluid delivered in the fluid circuit 18 by the pump means 16, for example in the form of hydraulic fluid, can be filtered by the filtering means 14 and can be cooled by the cooling means 12 for later use in a machine doing mechanical work. The hydraulic pump of the pumping means 16 can be driven by an electric motor 20. In the bypass to the actual hydraulic pump of the pumping means 16, a spring-loaded check valve 22 is provided which can be opened in the direction of the intake connection.

The filtering means 14 has at least one filter element 24 which can be replaced when it becomes fouled. For replacement of the filter element 24 in the fluid circuit 18, a triggerable blocking unit 26 permits the filtering means 14 to be separated from the pump means 16, while the cooling means 12 continues to be supplied with the fluid to be cooled via the fluid circuit 18.

The triggerable blocking unit 26 is preferably a 2/2-way control valve 28. For fluid supply of the cooling means 12 within the fluid circuit 18, a bypass branch a connecting line 30 which discharges or opens on one end into the supply line 32 for the filtering means 14 and the cooling means 12. The control valve 28 can be actuated by hand via an operating element 36 provided with knurling 34. The valve is provided with a catch means 38 to retain the position set by hand.

First and second check valves 40 and 42 open in the direction of the cooling means 12 into the connecting line 30, and into the supply line 32. The first check valve 40 is in the supply line 32 upstream of the filtering means 14, and is part of the control valve 28, as illustrated in the operating diagram of FIG. 1. In the unactuated position as shown in FIG. 1, the first check valve 40, spring biased in the direction of its blocked position, is connected to the supply line 32. Conversely, in the other position (not shown) of control valve 28, the supply line 32 is interrupted or blocked. In the supply line 32 in turn in the direction of the flowing fluid upstream and downstream of the filtering means 14 and between the connection points 46 of the connecting line 30, there are check valves 40, 42, 44. All the check valves 40, 42 and 44 are kept spring-biased in the direction of their closed position shown in FIG. 1. The closing pressure of the check valve 42 in the connecting line 30 of the bypass branch is greater than the closing pressure of each of the check valves 40, 44 in the supply line 32.

To ascertain the degree of fouling of the filter element 24 of the filtering means 14, a differential pressure determination means 48 ascertains the differential pressure in the fluid direction upstream and downstream of the filter element 24. Above a settable threshold for differential pressures, the relevant fouling is reported to the plant operator for replacement of the filter element 24. The indicated differential pressure is established, viewed in the fluid direction of the fluid circuit 18, between the blocking unit 26 and the filter element 24 and between the cooling means 12 and the third check valve 44 at one connection point 46. The differential pressure determination means 48 is preferably a manometric switch which operates at a settable threshold and then indicates the necessary filter element replacement.

The cooling means 12 includes a plate heat exchanger 50. The cooling medium fluid, preferably water, cools the heated fluid in a counterflow 52. The connections for the pertinent counterflow operation with a cooling medium are shown accordingly in the drawings. For operation of the cooling means 12, a control unit 54, after a settable temperature threshold is exceeded, switches on the cooling means 12. When the temperature threshold is not reached, for example 45° C., the control unit returns the unheated fluid to the tank T via the fluid circuit 18, bypassing the cooling means 12.

Figure 2A:
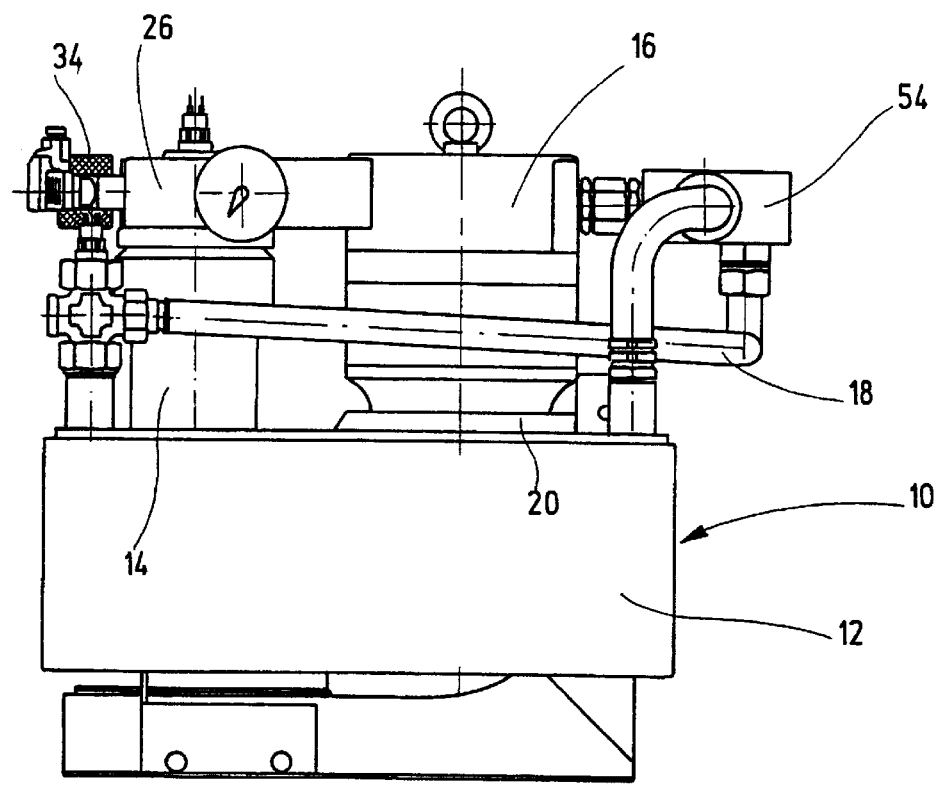
FIG. 2a is a front elevational view of the fluid cooling device of FIG. 1.
Figure 2B:
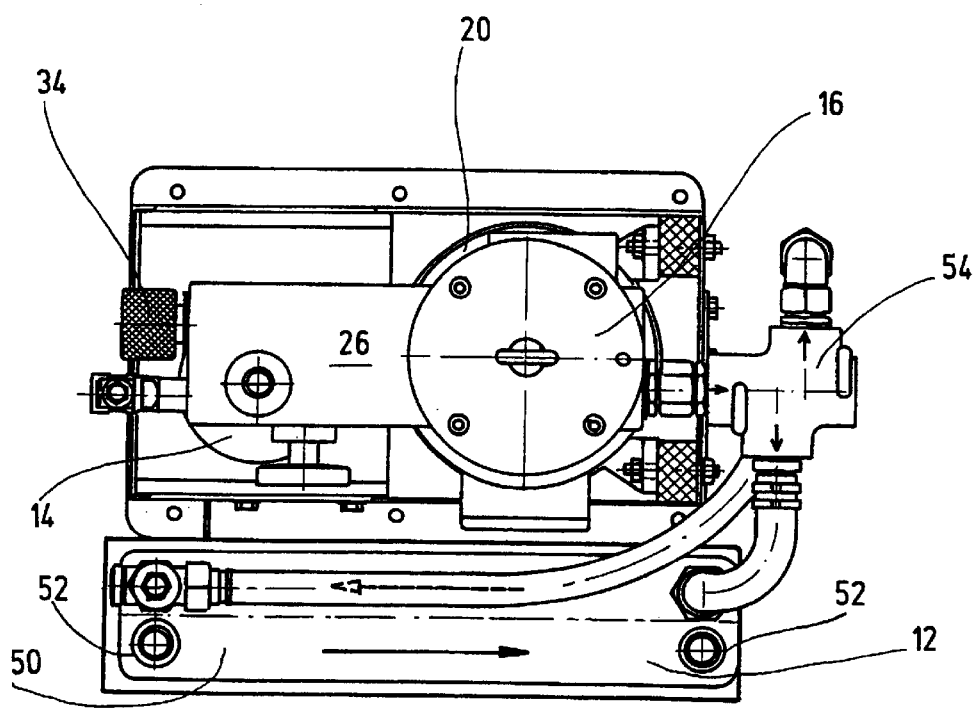
FIG. 2b is a side elevational view of the cooling device of FIG. 1.
Figure 2C:
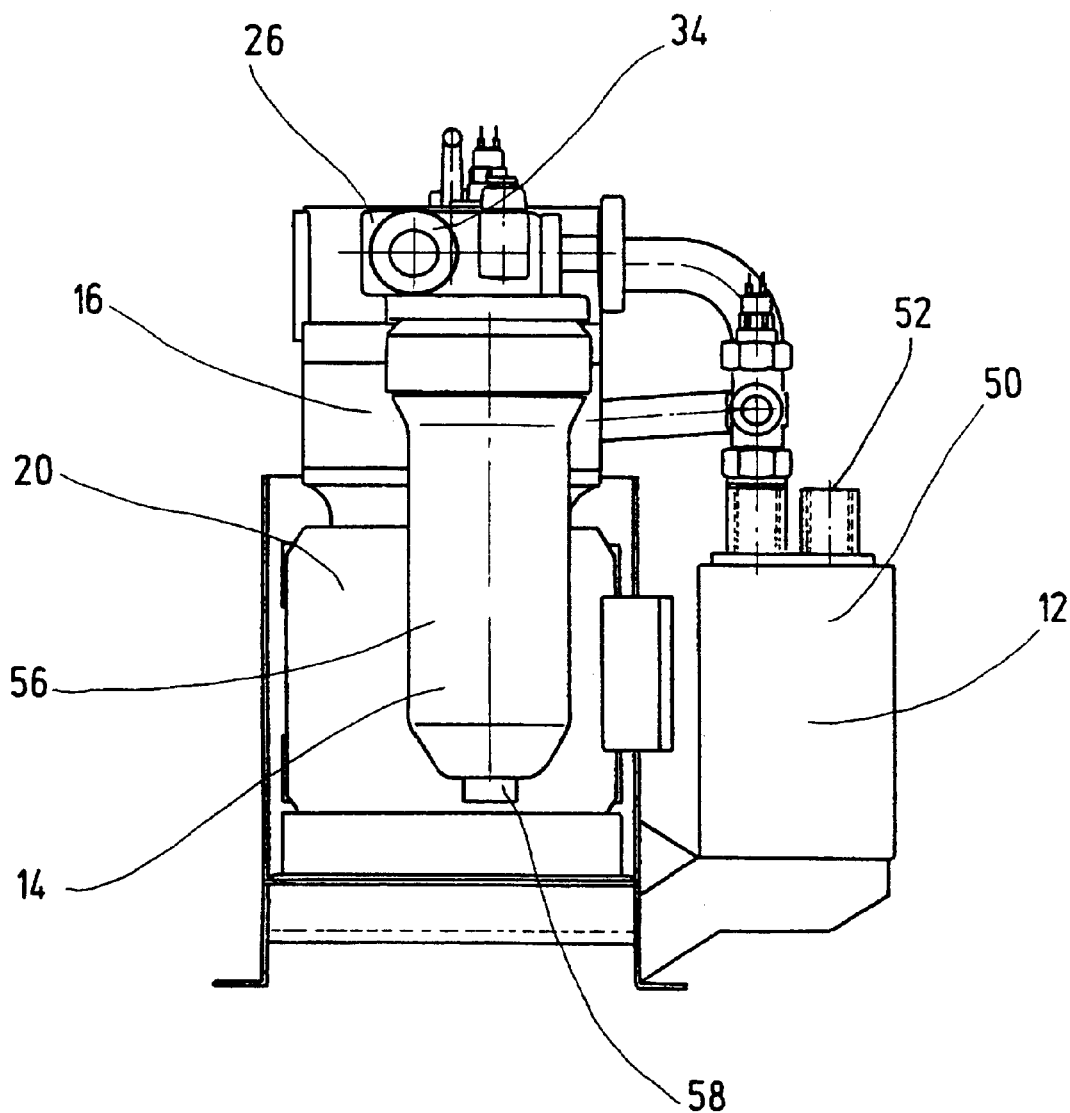
FIG. 2c is a top plan view of the fluid cooling device of FIG. 1.

If the differential pressure determination means as the monitoring means 48 indicates fouling of the filtering means 14 with its filter element 24, the control valve 28 of the blocking unit 26 is actuated by hand via the operating element 36 and is moved into its blocked position. The fluid flow from the pumping means 16 is then supplied, past the check valve 42 via the connecting line 30, directly to the cooling means 12 for continuing cooling. The check valve 42 is used moreover as the filter bypass valve to bypass the filter unit. The operating pressure within the fluid circuit 18 automatically closes the check valve 44 in the supply line 32. The filter element 24 of the filtering means 14 is completely separated from the fluid flow of the circuit, which circuit continues to permanently operate. By relieving the contents of the filter housing 56 via the drain screw 58 (compare FIG. 2b), a fouled filter element 24 can be replaced by a new, unused filter element. After successfully changing the element and closing the drain hole via the drain screw 58, the oil flow to the filter element can in turn be released on the control valve 28. The check valve 42 then automatically closes by spring force and again guides the oil flow through the filter element 24 of the filtering means 14. The third check valve 44 likewise opens automatically and the fluid circuit 18 again operates in the desired filtration mode. The closing force of the check valve 42 is designed to be stronger than the closing force of the check valve 40 to ensure that in the unactuated state of the control valve 26 the bypass function does not unintentionally take place.

While one embodiment has been chosen to illustrate the invention, it will be understood by those skilled in the art that various changes and modifications can be made therein without departing from the scope of the invention as defined in the appended claims.

What is claimed is:

1. A fluid cooling device combining cooling, filtering and pumping in one unit, comprising:
   a fluid circuit;
   a pump in said fluid circuit for conveying fluid through said fluid circuit;
   a filter, with a replaceable filter element upon becoming fouled, in said fluid circuit;
   a cooler for cooling fluid in said fluid circuit;
   a control valve in said fluid circuit separating said filter from said pump, while fluid continues to be supplied to said cooler for cooling, for replacement of said filter element, said control valve being actuatable by hand and having a catch retaining said control valve in a set position; and
   a bypass connecting line in said fluid circuit extending parallel to said filter and connected to a supply line leading to said cooler for supplying fluid to said cooler when said filter is separated from said pump.

2. A fluid cooling device according to claim 1 wherein at least one check valve is in said bypass connecting line and opens in the direction of said cooler.

3. A fluid cooling device according to claim 2 wherein additional check valves are located in said supply line with said filter and said cooler at locations upstream and downstream of said filter and between connecting points of said bypass connecting line with said supply line.

4. A fluid cooling device according to claim 3 wherein a first one of said check valves is located in said supply line upstream of said filter and is part of said control valve.

5. A fluid cooling device according to claim 4 wherein all of said check valves are spring biased to closed positions thereof to provide closing pressures thereof; and said closing pressure of said check valve in said bypass connecting line is greater than said closing pressure of each of said check valves in said supply line.

6. A fluid cooling device according to claim 1 wherein said cooler comprises a plate heat exchanger employing a fluid cooling medium.

7. A fluid cooling device according to claim 6 wherein said fluid cooling medium is water.

8. A fluid cooling device according to claim 1 wherein a control unit is located in said fluid circuit and switches said cooler on after a settable temperature threshold is exceeded.

9. A fluid cooling device according to claim 1 wherein a monitor interacts with said filter to determine the degree of fouling of the filter.

10. A fluid cooling device combining cooling, filtering and pumping in one unit, comprising a fluid circuit;

a pump in said fluid circuit for conveying fluid through said fluid circuit;

a filter, with a replaceable filter element upon becoming fouled, in said fluid circuit;

a cooler for cooling fluid in said fluid circuit;

a control valve in said fluid circuit separating said filter from said pump, while fluid continues to be supplied to said cooler for cooling, for replacement of said filter element;

a bypass connecting line in said fluid circuit extending parallel to said filter and connected to a supply line leading to said cooler for supplying fluid to said cooler when said filter is separated from said pump; and at least one check valve in said bypass connecting line opening in the direction of said cooler.

11. A fluid cooling device according to claim 11 wherein additional check valves are located in said supply line with said filter and said cooler at locations upstream and downstream of said filter and between connecting points of said bypass connecting line with said supply line.

12. A fluid cooling device according to claim 11 wherein a first one of said check valves is located in said supply line upstream of said filter and is part of said control valve.

13. A fluid cooling device according to claim 12 wherein all of said check valves are spring biased to closed positions thereof to provide closing pressures thereof; and said closing pressure of said check valve in said bypass connecting line is greater than said closing pressure of each of said check valves in said supply line.

14. A fluid cooling device according to claim 10 wherein said cooler comprises a plate heat exchanger employing a fluid cooling medium.

15. A fluid cooling device according to claim 14 wherein said fluid cooling medium is water.

16. A fluid cooling device according to claim 10 wherein a control unit is located in said fluid circuit and switches said cooler on after a settable temperature threshold is exceeded.

17. A fluid cooling device according to claim 10 wherein a monitor interacts with said filter to determine the degree of fouling of the filter.

* * * * *